United States Patent

[11] 3,554,479

| [72] | Inventor | Charles O. Slemmons<br>Akron, Ohio |
|---|---|---|
| [21] | Appl. No. | 765,513 |
| [22] | Filed | Oct. 7, 1968 |
| [45] | Patented | Jan. 12, 1971 |
| [73] | Assignee | The General Tire & Rubber Company<br>a corporation of Ohio |

[54] DEVICE FOR ATTACHING A TRAVEL DISTANCE MEASURING INSTRUMENT TO A WHEELED VEHICLE
2 Claims, 3 Drawing Figs.

[52] U.S. Cl.................................................... 248/289,
73/493, 287/88
[51] Int. Cl........................................................ G01p 1/00
[50] Field of Search........................................... 248/289,
417, 278, 205; 73/493; 287/12, 88; 33/172B,
147L, 171, 141A, 141E, (Dial indicator shock
absorber dig.)

[56] References Cited
UNITED STATES PATENTS

| 438,238 | 10/1890 | Jefferies et al.............. | 287/12 |
|---|---|---|---|
| 546,631 | 9/1895 | White........................... | 287/88 |
| 1,918,190 | 7/1933 | Miller et al. .................. | 248/417 |
| 2,210,147 | 8/1940 | Griffith......................... | 287/12 |

Primary Examiner—Edward C. Allen
Assistant Examiner—J. Franklin Foss
Attorneys—Kemon, Palmer and Estabrook, Frank C. Rote and James A. Lucas

ABSTRACT: A device for attaching a travel distance measuring instrument to a wheeled vehicle is formed with a mounting bracket, a split ball clamp, and spring-biased indexing unit for maintaining the measuring instrument in a predetermined position relative to the vehicle wheel.

PATENTED JAN 12 1971

3,554,479

INVENTOR
Charles O. Slemmons
BY Kenway, Palmer & Estabrook
ATTORNEYS 3,554,479

1

DEVICE FOR ATTACHING A TRAVEL DISTANCE MEASURING INSTRUMENT TO A WHEELED VEHICLE

BACKGROUND OF THE INVENTION

A variety of devices have been known in the art for attaching a measuring instrument to a wheeled vehicle. The utility and adequacy of such devices depends on the nature of the instrument and the type of vehicle it is to be mounted on.

Travel distance measuring instruments, be they designed for attachment to large, sophisticated vehicles or to small, simple carts, such as golf carts, in order for them to be accurate and dependable, must be adequately supported on the vehicle so as to overcome the effects of speed, road irregularity, and constant use. Desirably, in certain applications the mounting device should also lend itself to frequent mounting and demounting, to frequent adjustment of the instrument from active to inactive position, and vice versa. Other desirable features includes simplicity of construction, absence of any maintenance requirements, and low cost of production.

BRIEF SUMMARY OF THE INVENTION

This invention provides a device made up of several elements which, together, form a novel bracket for mounting a distance measuring instrument to a wheeled vehicle. The device comprises a base, adapted to be secured to a supporting member of a vehicle, a split ball clamp and socket, securable to the base by means of a nut and bolt and having registering grooves between the meeting halves of the ball for receiving and rigidly holding a portion of said instrument. Spring-biased indexing means provide a shock-absorbing effect in maintaining the instrument in position.

Fabricated or molded from any suitable material, the device has been found to be of particular utility in attaching a yardage counter to a golf cart, although the scope of its usefulness is not limited in this regard.

OBJECTS OF THE INVENTION

It is a primary object of this invention to provide a device for attaching a travel distance measuring instrument to a wheeled vehicle, which device is designed to maintain said instrument in active position despite shock and road irregularities.

Another object is to provide such a device which efficiently serves its function over prolonged periods of use, which is simple of construction, relatively easy to mass-produce, and lends itself to frequent mounting, demounting, and adjustment of the position of said instrument on said vehicle.

DETAILED DESCRIPTION OF THE INVENTION

Figure 1:
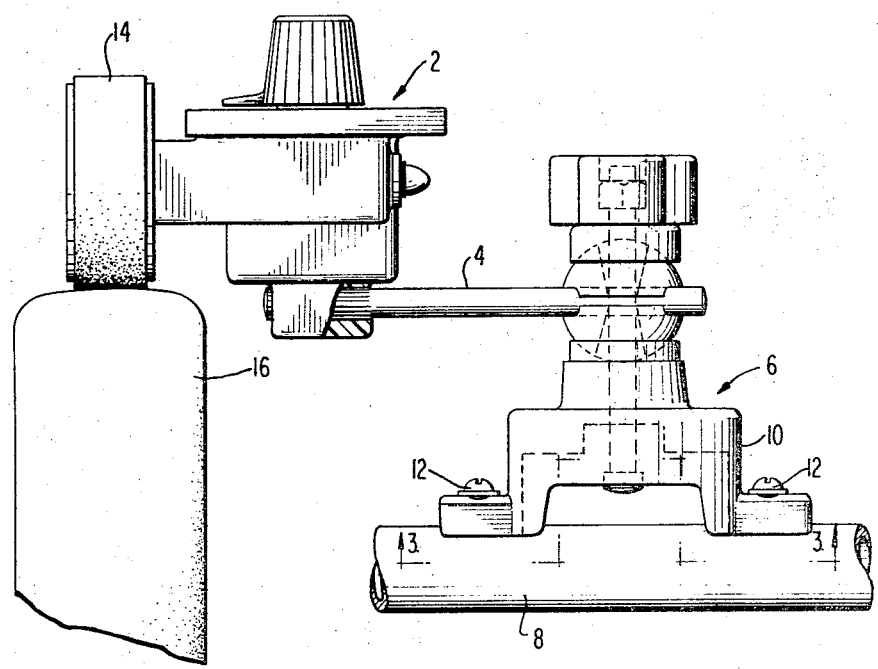
FIG. 1 is a fragmentary side view of the device mounted on a supporting member of a vehicle and with a distance measuring instrument attached thereto.

Referring now to the drawing, there is shown in FIG. 1 a travel distance measuring instrument 2 which is mounted, through shaft 4 thereof and by means of the device 6 of the invention, to a support member or strut 8 of a vehicle which is not shown. The device 6 can be secured to the support member 8 by any convenient means, through bracket 10, such as illustrated at 12. Other means for securing the device 6 to the support member 8 may be used, such as hose clamps or any other type of clamping or securing arrangement.

The instrument 2 can be of any type, and it usually comprises a wheel 14 which, during operation, is in frictional contact, and rotates, with wheel 16 of the vehicle.

Figure 2:
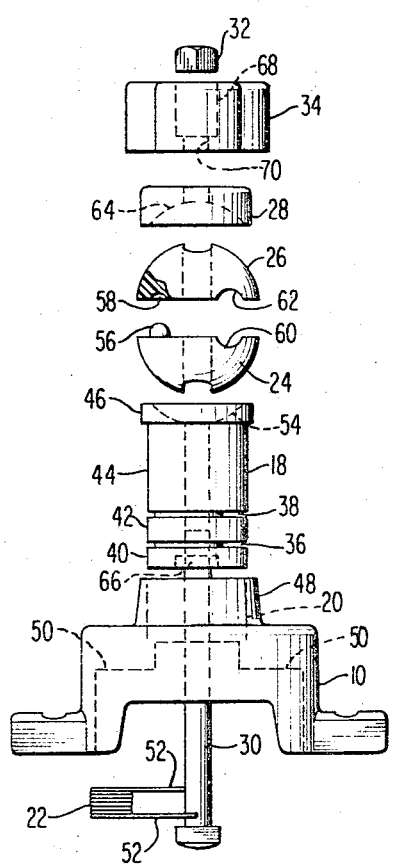
FIG. 2 is an exploded view of the various parts of the device, shown in position for assembly.

Reference will now be made to FIG. 2 for a detailed description of the various elements which make up the device of the invention. In the main, these comprise a mounting bracket 10, an indexing cam shaft 18 which is lodged in a central aperture 20 of the bracket 10 by means of bias cantilever springs, one of which is indicated at 22, a split ball clamp 24 and 26, and a cap 28, with registering central apertures in the cam shaft, split ball clamp, and cap for receiving a bolt 30 which secures the assembly together by means of a nut 32 and wing wrench 34 in which nut 32 is seated.

Figure 3:
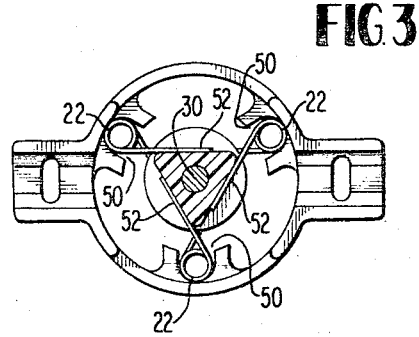
FIG. 3 is a bottom view looking up into the support bracket of the device.

The cam shaft is provided with triangular grooves 36 and 38 which divide the outer surface of the cam shaft into three axial segments 40, 42 and 44. When inserted into central aperture 20, segments 40 and 42 will protrude beyond aperture 20 inside bracket 10, as enlarged portion 46 of segment 44 comes to rest on shoulder 48 of bracket 10. Three bias springs, one of which is indicated at 22, lodged in slots 50 within the bracket, act to bias the cam shaft 18 against rotation. This is illustrated in FIG. 3 where one arm 52 of each spring is shown bearing against one side of one triangular groove 36, while the other arm not appearing in FIG. 2, of each coil spring bears against one side of the second triangular groove 38. The bias of the springs can be overcome only if sufficient angular pressure is applied to the cam shaft 18, whereupon the cam shaft 18 will rotate one-third of a revolution, the arms of the springs coming to rest again, each on the adjacent side of the triangular grooves.

Returning now to FIG. 2, the inside surface of enlarged portion 46 of segment 44 is concavely contoured, as indicated at 54, so as to receive, and mate with, the bottom half 24 of a split ball clamp, the upper half of which is denoted by numeral 26.

Complementary tongue 56, in 24, and groove 58, in 26, act to lock the two halves of the split ball clamp against rotation relative to one another when the device is assembled and secured; and registering grooves 60 and 62 are provided to accommodate, and clamp in place, a shaft 4 (see FIG. 1) of the instrument 2.

Mating with the top half 26 of the split ball clamp is a cap 28, the lower inside surface of which is concavely contoured as indicated at 64.

The assembly is secured together by means of a pin 30 with a head portion. In a preferred embodiment, this would be a bolt having a square head which is designed to fit snugly in a square slot 66 provided therefor in the bottom of segment 40 of cam shaft 18, and a nut 32. The nut 32 is snugly received in complementary slot 68 of wing wrench 34 which has a central aperture 70 for inserting the end of the bolt 30 therethrough.

As becomes apparent from the above illustration, using a split ball clamp permits a certain degree of play in positioning, or adjusting the position of, the instrument being held by the device of the invention before rigidly securing the assembly together.

The wing wrench 34, in combination with other parts of the device, serves three main purposes. First, it provides an integral means in the device for securing and unsecuring the device. Where the cap 28 is made of a softer material than the metal of the nut, this design of the wing wrench 34 secondly serves to prevent wear in the cap 28 by shielding it from direct contact with the nut 32. Finally, when it is desired to alter the position of the instrument, such as from active to inactive position (from a position in which the wheel 14 of the instrument is in frictional contact with the wheel 16 of the vehicle to a position of no contact) and vice versa, this can be done by applying pressure to the instrument 2 or the rod 4 causing the assembly, including the cam shaft, the split ball clamp and the instrument, to turn one-third of a revolution, with the arms of the spring shifting to adjacent sides of the triangular grooves as described earlier. The same result can be achieved by applying pressure, beyond what is necessary to rigidly secure the assembly together, to the wing wrench.

During operation, the springs act to urge the instrument held by the split ball clamp to remain in contact with the wheel despite any shock produced by excessive speed, road irregularities, and so forth. With arms 52 in grooves 36, 38 the springs also function to prevent disassembly of the device.

While it is preferred that the various elements of the device just described be molded from thermoplastic or thermosetting material, it is within the contemplation of the invention to also fabricate them from any type of material which lends itself to fabrication.

I claim:

1. In a device for attaching a travel distance measuring instrument to a wheeled vehicle, the combination comprising:
   a. a mounting bracket adapted to be rigidly fastened to said vehicle adjacent a wheel thereof;
   b. a bolt having a head portion and a stem portion rotatably mounted in said bracket;
   c. indexing means rotatably mounted on said bracket for engagement with said head portion of said bolt;
   d. spring means mounted on said bracket, which spring means is adapted to urge said indexing means to a predetermined position on said bracket;
   e. a split ball and socket with complementary means between the two meeting halves of said ball for locking them against rotation relative to each other and with registering grooves in the meeting halves of said ball, said ball being operable to clamp a portion of said instrument in said grooves between said meeting halves of the ball, movement of said ball enabling the placement of another portion of said instrument into, and out of, contact with said wheel of said vehicle; and
   f. means in said device to immobilize said ball on said bolt once said other portion of said instrument has been placed in the desired position comprising a nut screwed on the stem portion of said bolt and a complementary wing wrench engaging the outer walls of said nut, said spring means and said indexing means being adapted to maintain contact between said other portion of said instrument and said wheel.

2. In a device for attaching a travel distance measuring instrument to a wheeled vehicle, the combination comprising:
   a. a mounting bracket adapted to be rigidly fastened to said vehicle adjacent a wheel thereof;
   b. a bolt having a head portion and a stem portion rotatably mounted in said bracket;
   c. indexing means rotatably mounted on said bracket for engagement with the head portion of said bolt comprising a cam shaft insertingly mounted within a central hole for inserting said bolt therethrough and two separate circumferential grooves, polygonal in cross section, with spring means comprising several separate loops, lodged within said bracket, each finger of each loop bearing against one side of the polygonal grooves;
   d. spring means mounted on said bracket, which spring means is adapted to urge said indexing means to a predetermined position on said bracket;
   e. clamp means movably mounted on the stem portion of said pin, which clamp means is operable to clamp a portion of said instrument to said device, movement of said clamp means enabling the placement of another portion of said instrument into, and out of, contact with said wheel of said vehicle; and
   f. means in said device to immobilize said clamp means once said other portion of said device has been placed in a desired position, said spring means and said indexing means being adapted to maintain contact between said other portion of said instrument and said wheel.